US008701009B2

(12) United States Patent
Dantec et al.

(10) Patent No.: US 8,701,009 B2
(45) Date of Patent: Apr. 15, 2014

(54) SYSTEM AND METHOD FOR ANALYZING TIME FOR A SLIDE PRESENTATION

(75) Inventors: Fabrice Dantec, Saint-Renan (FR); Jerome Elleouet, Lannilis (FR)

(73) Assignee: Alcatel Lucent, Paris (FR)

( * ) Notice: Subject to any disclaimer, the term of this patent is extended or adjusted under 35 U.S.C. 154(b) by 984 days.

(21) Appl. No.: 11/966,184

(22) Filed: Dec. 28, 2007

(65) Prior Publication Data
US 2009/0172550 A1 Jul. 2, 2009

(51) Int. Cl.
*G06F 3/00* (2006.01)

(52) U.S. Cl.
USPC ........... 715/732; 715/730; 715/705; 715/833; 715/202; 715/203; 715/204

(58) Field of Classification Search
USPC .................. 715/730–732, 705, 833, 202–204
See application file for complete search history.

(56) References Cited

U.S. PATENT DOCUMENTS

| | | | | |
|---|---|---|---|---|
| 6,084,582 A | * | 7/2000 | Qureshi et al. ................ | 715/243 |
| 6,717,591 B1 | * | 4/2004 | Fiveash et al. ................ | 715/732 |
| 6,774,920 B1 | * | 8/2004 | Cragun ........................... | 715/730 |
| 7,206,773 B2 | * | 4/2007 | Erol et al. .............................. | 1/1 |
| 7,240,287 B2 | * | 7/2007 | Qureshi et al. ................ | 715/730 |
| 7,454,708 B2 | * | 11/2008 | O'Neal et al. ................. | 715/730 |
| 7,554,576 B2 | * | 6/2009 | Erol et al. ................... | 348/211.3 |
| 7,698,645 B2 | * | 4/2010 | Fuse ............................. | 715/730 |
| 7,730,407 B2 | * | 6/2010 | Chiu et al. .................... | 715/732 |
| 7,779,355 B1 | * | 8/2010 | Erol et al. ..................... | 715/273 |
| 2001/0003479 A1 | * | 6/2001 | Fujiwara ....................... | 353/122 |
| 2002/0109712 A1 | * | 8/2002 | Yacovone et al. ............. | 345/732 |
| 2002/0120939 A1 | * | 8/2002 | Wall et al. ....................... | 725/87 |
| 2002/0140724 A1 | * | 10/2002 | Qureshi et al. ................ | 345/730 |
| 2003/0085913 A1 | * | 5/2003 | Ahmad et al. ................. | 345/730 |
| 2003/0202004 A1 | * | 10/2003 | Lin ................................ | 345/716 |
| 2004/0090424 A1 | * | 5/2004 | Hurley et al. ................. | 345/169 |
| 2004/0113935 A1 | * | 6/2004 | O'Neal et al. ................. | 345/732 |
| 2005/0044499 A1 | * | 2/2005 | Allen et al. ................... | 715/704 |
| 2006/0067578 A1 | * | 3/2006 | Fuse ............................. | 382/190 |
| 2007/0124681 A1 | * | 5/2007 | Abbar et al. .................. | 715/730 |
| 2007/0162858 A1 | * | 7/2007 | Hurley et al. ................. | 715/732 |
| 2008/0209330 A1 | * | 8/2008 | Cruver .......................... | 715/733 |

OTHER PUBLICATIONS

Lay; Key Slide—segments Annotation for Presentation Videos; © 2007; IEEE; 4 pages.*
Vinciarelli et al., Application of Information Retrieval Technologies to Presentation Slides; © 2006; IEEE; vol. 8, No. 5; 15 pages.*

* cited by examiner

*Primary Examiner* — Linh K Pham
(74) *Attorney, Agent, or Firm* — Hitt Gaines, PC

(57) ABSTRACT

A system and method for analyzing time for a slide presentation that permits a speaker to coordinate available time with the number of slides to be shown and a method of operating the same is described. In one embodiment, the system includes: (1) a time allocation tool enabling a user to establish a presentation time with respect to at least one slide in the slide presentation and allocate any remaining presentation time to each remaining slide on a pro-rata basis and (2) a monitoring module associated with the time allocation tool to monitor the progress of the slide presentation and display a time status for the slide presentation as well as a slide number and a time status for a currently displayed slide.

18 Claims, 2 Drawing Sheets

SYSTEM AND METHOD FOR ANALYZING TIME FOR A SLIDE PRESENTATION

TECHNICAL FIELD OF THE INVENTION

The invention is directed, in general, to a time analysis system and, more specifically, to a system and method for analyzing time for a slide presentation.

BACKGROUND OF THE INVENTION

Speakers universally use slides during a speech or presentation to explain or illustrate the topic. They use slides for a variety of reasons. Sometimes the speech is technical and slides are necessary to impart subject matter comprehension to the audience. At other times slides are used to add to the richness of the presentation or to hold the attention of the audience. For example, a speaker talking about drought in Africa can effectively use slides showing rainfall amounts in various regions of Africa from a historical perspective. Slides can be included in such a presentation to demonstrate the extent of such a drought and its effects on the local population and economy caused by declines in agricultural productivity.

Slides are also used by a speaker as a guide or outline in making the presentation to enable the audience to follow the presentation in an orderly manner. As used herein, the terms "slide" or "slides" include both actual photographic transparency slides as well as computer-generated slides, such as those used in a PowerPoint® presentation, as well as any equivalent thereof. (PowerPoint® is commercially available from the Microsoft Corporation of Redmond, Wash.) Any such slide or slide-type medium are intended to be included within the meaning of "slide" as such term is used herein and all are within the intended scope of the invention described herein.

In making a presentation the allocation of time during the presentation and keeping to the time schedule is always a challenge. Frequently a speaker will get so involved in some aspect of the presentation that little time remains for the remainder of the presentation. In such case, the speaker inevitably has to rush through all or portion of the presentation and frequently runs over the allocated time. In some cases a speaker will encounter timing issues due to audience participation when someone either asks a question or offers their own commentary during the presentation. Hereinafter this kind of audience participation as well as invited audience participation, such as a question and answer period, is called "audience interaction." Audience interaction during the presentation will generally get the speaker off time with the result that all or a portion of the presentation is rushed or an incomplete presentation is made.

The current state of the art for a slide presentation generally involves using a computer to show slides. The slide presentation is preloaded and projected on a screen. These slides range from photographs loaded into the computer memory to information or outline slides created on the computer by or for the speaker. A favorite presentation application currently being uses by many speakers is PowerPoint®. Although many presentations are in a PowerPoint® format, other presentation software and formats are available, and others will likely be developed in the future. Regardless of the presentation software or format, the speaker is still faced with the problem of covering the subject within an allocated time. One aspect of PowerPoint® provides limited help to a speaker by including a count down feature that shows the time allocated to a presentation which can be displayed as either time expended or time remaining. While this is suitable for some purposes, what is needed in the art is a more comprehensive and information-rich system and method for allocating slide presentation time to slides in a manner predetermined by the speaker.

SUMMARY OF THE INVENTION

To address the above-discussed deficiencies of the prior art, one aspect of the invention provides a system for analyzing time for a slide presentation to coordinate available presentation time with the number of slides to be shown. In one embodiment, the system includes: (1) a time allocation tool enabling a user to establish a presentation time with respect to at least one slide and allocate remaining presentation time to each remaining slide on a pro-rata basis and (2) a monitoring module associated with the time allocation tool to monitor the progress of the slide presentation and display a time status for the slide presentation as well as a slide number and a time status for a currently displayed slide. Methods of operating a system to analyze time for a slide presentation are also described.

Another aspect of the invention provides a method of operating a system for analyzing time for a slide presentation. In one embodiment, the method includes: (1) causing a time allocation tool to establish a presentation time with respect to at least one slide in a slide presentation, the time allocation tool allocating an aggregate remaining presentation time to each remaining slide in the slide presentation on a pro-rata basis and (2) causing a monitoring module associated with the time allocation tool to monitor the progress of the slide presentation, the monitoring module and displaying a time status for the slide presentation as well as a slide number and time status for a currently displayed slide.

The foregoing has outlined some aspects of the invention so that those skilled in the pertinent art may better understand the detailed description of the invention that follows. Various embodiments of the invention will be described hereinafter that form the subject of the claims of the invention. Those skilled in the pertinent art should appreciate that they can readily use the disclosed conception and specific embodiment as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION

Figure 1:
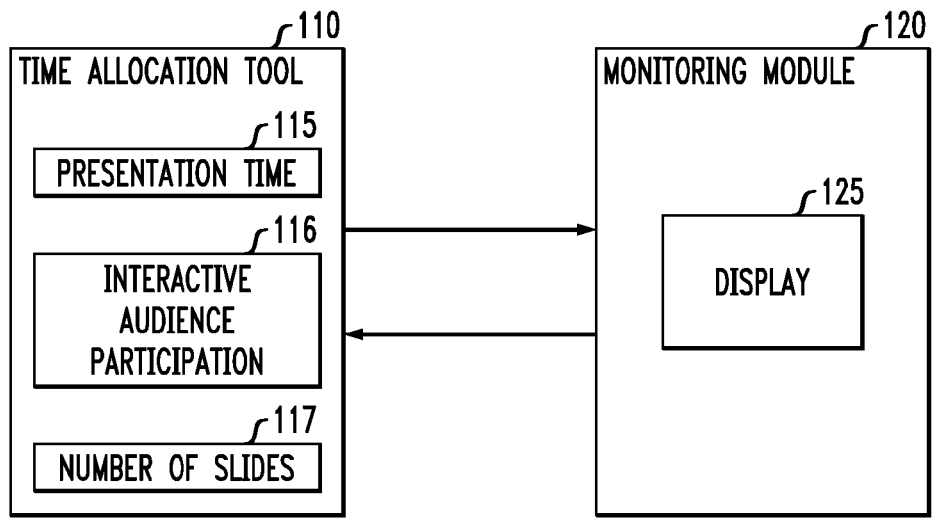
FIG. 1 illustrates a block diagram of a system constructed in accordance with the invention for analyzing time for a slide presentation.

Referring initially to FIG. 1, illustrated is a block diagram of a system 100 constructed in accordance with the invention for analyzing time for a slide presentation. The system 100 includes a time allocation tool 110 that allocates presentation time among the slides in a slide presentation. In one embodiment, the time allocation tool 110 allocates time between a slide presentation and an interactive audience period, such as a question and answer period after the conclusion of the slide presentation. As those skilled in the pertinent art will understand, the time allocation tool 110 is part of a computer program embodying the system 100, and a user operates the system 100 with a computer. A user enters information into the time allocation tool 110 regarding the aggregate presentation time 115, the time to be allocated to interactive audience participation 116, and the number of slides 117 included in the presentation. The time allocation tool 110, with user input, as hereinafter described, then allocates an amount of time to each slide in the presentation.

Associated with the time allocation tool 110 is a monitoring module 120 that monitors the progress of the slide presentation and displays the pertinent information to a user or speaker on a computer screen or other display device 125. Displayed is the time status for the slide presentation as well as a time status and slide number for the slide currently displayed. Certain embodiments of such a display are hereinafter explained.

Figure 2:
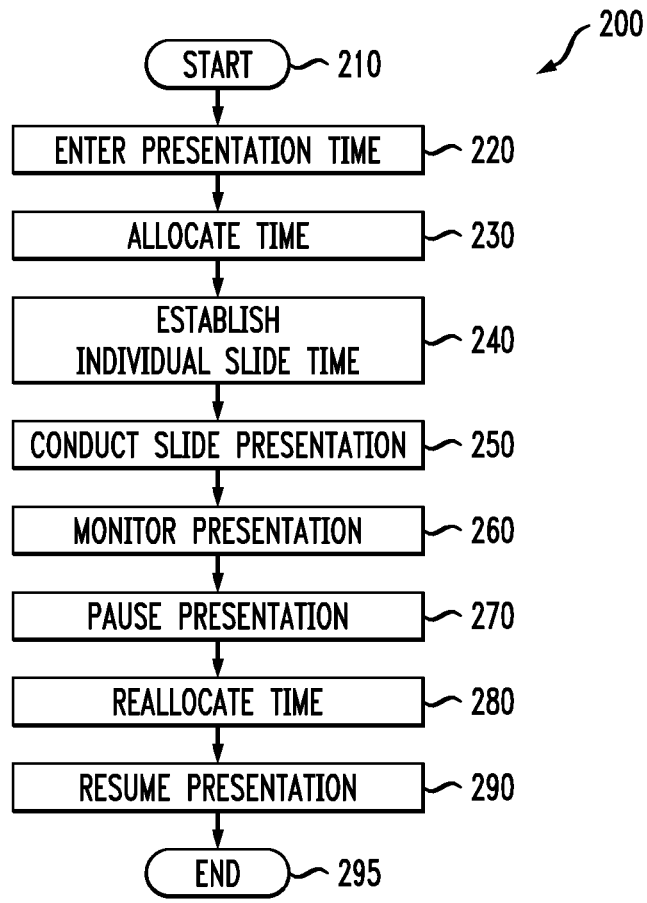
FIG. 2 illustrates a flow diagram of the operation of one embodiment of a system constructed in accordance with the invention for analyzing time for a slide presentation.

Turning now to FIG. 2, illustrated is a flow diagram of the operation 200 of one embodiment of a system 100 constructed in accordance with the invention for analyzing time for a slide presentation. The operation commences with a start step 210. Using a computer, in an enter presentation time step 220, a user enters the total presentation time into the time allocation tool. In an allocate time step 230, the user determines how much of the presentation time should be allocated to the slide presentation and how much should be allocated to interactive audience participation, such as a question and answer period. For example, if the user enters sixty minutes as the total presentation time in the enter presentation time step 220 and decides that ten minutes should be reserved for interactive audience participation, in the allocate time step 230, the time allocation tool 110 will allocate fifty minutes to the slide presentation.

In an establish individual slide time step 240, the user enters how much of the presentation time is to be allocated to at least one slide in the presentation. For example, if a slide presentation consists of twenty-five slides, and the total time allocated to the slide presentation in the allocate time step 230 is fifty minutes, a straight pro-rata allocation would allocate two minutes to each slide. However, if one of the slides contains limited information, such as the name of the speaker, a user may decide that such slide does not warrant a full two minutes. The user will then establish a lesser presentation time with respect to that slide in the establish individual slide time step 240. If the user determines that thirty seconds is an appropriate time for such slide, the user will cause the time allocation tool 110 to allocate thirty seconds of presentation time to that slide and the time allocation tool 110 will automatically reallocate the remaining forty-nine minutes and thirty seconds among the remaining twenty-four slides on a pro-rata basis.

If a user decides that more time is needed with respect to one or more slides, the user can allocate more time to such slides. For example, if certain slides in the presentation require more explanation or the verbal presentation associated with such slides requires more time, a user can cause the time allocation tool 110 to allocate an increased amount of time to such slides. The time allocation tool 110 will then make a corresponding adjustment with respect to the remaining slides. In continuation of the foregoing example, if a user decides that five minutes of presentation time should be allocated to a first slide and four minutes should be allocated to a second slide, the user will cause the time allocation tool 110 to make the appropriate allocation and the remaining time of forty and one-half minutes will be automatically reallocated among the remaining twenty-two slides on a pro-rata basis.

After the time parameters have been set using the time allocation tool 110, the speaker is then ready to present the slide presentation in a conduct slide presentation step 250. The monitoring module 120 will be caused to monitor the progress of the presentation and display relevant information to the speaker in a monitor presentation step 260. The monitoring module 120 will display relevant information regarding the status of the time for the presentation as well as the slide number currently displayed and its time status. Because the system 100 is not embedded in any particular slide presentation application, the monitoring module information need only be visible to the presenter. Of course, the system 100 can also be embedded within the slide presentation application and remain within the intended scope of the invention.

During the course of a typical slide presentation, particularly to a small group, it is not uncommon for the presentation to be interrupted with a question or for someone in the audience to present additional commentary. One aspect of the invention permits a user to allocate the time lost during such an interruption to the interactive audience participation period. Thus, when a presentation is interrupted, the slide presentation can be paused by the speaker in a pause presentation step 270. The speaker can pause the presentation by entering a computer command directly by pressing a pre-designated, or "hot," key or by using a remote control. In one embodiment, the system 100 automatically allocates the pause time to the interactive audience period in a reallocate time step 280. When the interruption is finished the slide presentation is resumed in a resume presentation step 290. During the course of the slide presentation the monitoring module 130 continues to provide constant feedback to the speaker as herein described. At the conclusion of the presentation, including the time allocated to interactive audience participation, the operation concludes with an end step 295.

Figure 3A:
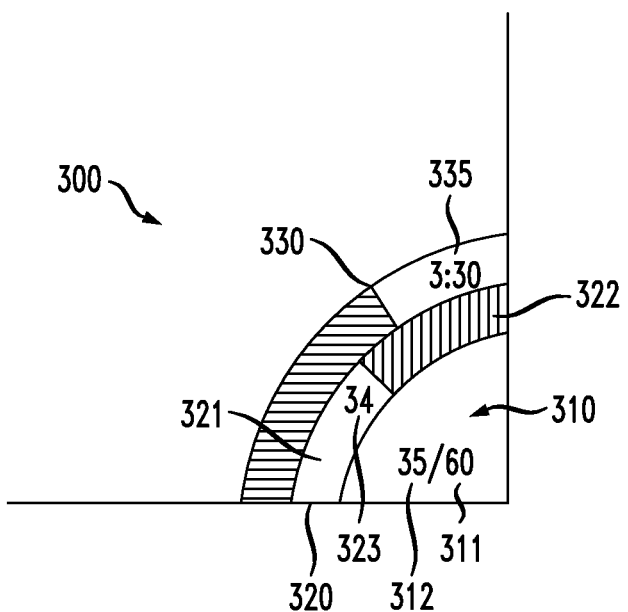
FIGS. 3A and 3B illustrate displays typical of those that can be used to furnish information to a speaker using a system constructed in accordance with the invention.
Figure 3B:
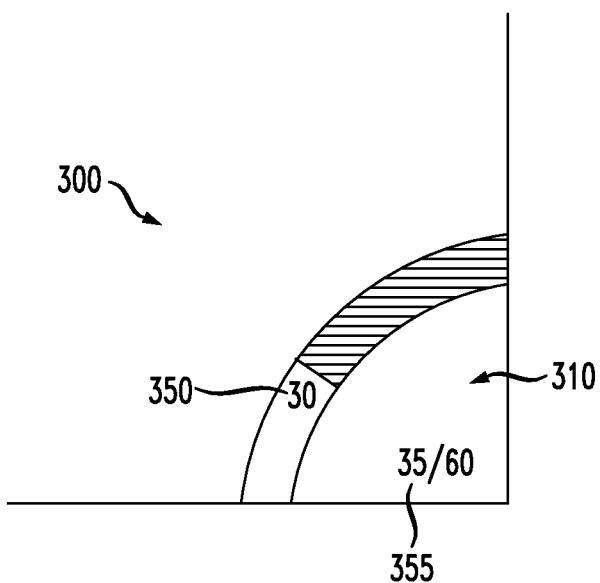

Turning now to FIGS. 3A and 3B, illustrated are displays typical of those used to furnish information to a speaker with a system 100 constructed in accordance with the invention. As those skilled in the pertinent art will understand, such information can be presented in a variety of different formats, all of which are within the intended scope of the invention. The illustrated embodiment uses a progress bar format that can be discretely and conveniently displayed on one corner of the speaker's computer screen.

FIG. 3A illustrates a time analysis display 300 with status or progress bars that relate the status or progress of a presentation to the speaker. The illustrated display 300 has a status bar 310 showing the total number of slides in the presentation 311 and the slide number 312 that should be currently displayed if the presentation is on schedule. A presentation progress bar 320 shows the elapsed time 321 of the presentation and the time remaining 322. The illustrated presentation progress bar 320 shows elapsed time as white and time remaining in a cross-hatch design. Of course, any color or design can be used in such progress bars and still be within the intended scope of the invention. The slide number currently displayed 323 is also shown.

A slide progress bar 330 relates the time expended, or elapsed time, with respect to the slide currently shown and, in a contrasting color or design, the remaining time allocated to that slide. Also shown is the total time 330 allocated to that particular slide by the system 100, which time can be digitally counted down in certain embodiments.

In some embodiments, the speaker controls the display. In FIG. 3B, the speaker has suppressed the slide progress bar 330 because he or she is behind on the presentation, as can be seen from the fact that slide 30 is currently being displayed 350 whereas slide 35 should be displayed 335 if the speaker was on time. If the speaker gets way behind on the presentation, in one embodiment the status bar 310 will change colors or flash as an alarm to the speaker. The time to sound this alarm can be established by the user. In another embodiment, the status bar 310 will change colors depending on the amount of time remaining in the presentation. For example, the status bar 310 may be green until three minutes remain in the total time allocated for the presentation and then turn yellow as a warning at the three minute mark. When the total time for the presentation has elapsed, the status bar may turn red as a warning to the speaker that he or she must quickly wind up the presentation.

The invention also encompasses several additional embodiments of methods of operating a system constructed in accordance with the invention for analyzing time for a slide presentation. Sufficient detail has been set forth herein to enable one of ordinary skill in the pertinent art to understand and practice the various embodiments of such methods.

Although the invention has been described in detail, those skilled in the pertinent art should understand that they can make various changes, substitutions and alterations herein without departing from the scope of the invention in its broadest form.

What is claimed is:

1. A system for analyzing time for a slide presentation, comprising:
   a computer;
   a monitor;
   a monitoring module configured to display information on the monitor;
   a time allocation tool configured to allocate an amount of time for each slide of said slide presentation to be shown, wherein said amount of time allocated for each slide includes:
   a predetermined amount determined prior to when said slide presentation is given by a user, wherein said predetermined amount of time can be different for any of said each slide;
   a pro rata amount calculated prior to when said slide presentation is given based on a total presentation time for said slide presentation less a sum of said predetermined amount of time for each slide with a predetermined amount of time and a total number of slides to be presented during said slide presentation; and
   a pro rata amount calculated during said slide presentation based on a remaining amount of said total presentation time less a remaining sum of said predetermined amount of time of each remaining slide with a predetermined amount of time and a remaining number of said total number of slides yet to be presented during said slide presentation;
   where in the monitoring module associated with said time allocation tool configured to display on the monitor to said user during a course of said slide presentation a time status of said slide presentation, a slide number, and a time status of a slide currently displayed,
   wherein said time allocation tool and said monitoring module are performed by the computer; and
   wherein said monitoring module displays a status showing the total number of slides to be displayed, the number of the slide currently being displayed and the next slide number to be displayed.

2. The system as recited in claim 1 wherein said total presentation time is divided between said slide presentation and an interactive audience period.

3. The system as recited in claim 2 wherein said user can allocate time used for audience interaction during said slide presentation to said interactive audience period.

4. The system as recited in claim 1 wherein said monitoring module displays an elapsed time and a remaining time for said slide presentation.

5. The system as recited in claim 1 wherein said monitoring module displays an elapsed time and a remaining time allocated to a currently displayed slide.

6. The system as recited in claim 1 wherein said monitoring module displays on said monitor a warning of time remaining and an expiration time for said slide presentation.

7. The system as recited in claim 6 wherein said warning is displayed on said monitor with different colors if said slide presentation is on time or running late.

8. The system as recited in claim 1 wherein said user can suppress said time status for said slide presentation.

9. The system as recited in claim 1 wherein said user can suppress said time status for said currently displayed slide.

10. A method of operating a system for analyzing time for a slide presentation, comprising:
    allocating an amount of time for each slide of said slide presentation to be shown, wherein said amount of time allocated for each slide includes:
    a predetermined amount determined prior to when said slide presentation is given by a user, wherein said predetermined amount of time can be different for any of said each slide;
    a pro rata amount calculated prior to when said slide presentation is given based on a total presentation time for said slide presentation less a sum of said predetermined amount of time for each slide with a predetermined amount of time and a total number of slides to be presented during said slide presentation; and
    a pro rata amount calculated during said slide presentation based on a remaining amount of said total presentation time less a remaining sum of said predetermined amount of time for each remaining slide with a predetermined amount of time and a remaining number of said total number of slides yet to be presented during said slide presentation; and
    displaying, in association with said allocating, on a monitor to said user during a course of said slide presentation a time status of said slide presentation, a slide number, and a time status of a slide currently displayed,
    wherein said allocating and said displaying are performed by a computer; and
    wherein said monitoring module displays a status showing the total number of slides to be displayed, the number of the slide currently being displayed and the next slide number to be displayed.

11. The method as recited in claim 10 wherein said total presentation time is divided between said slide presentation and an interactive audience period.

12. The method as recited in claim 11 wherein a user can allocate time used for audience interaction during said slide presentation to said interactive audience period.

13. The method as recited in claim 10 wherein said monitoring module displays an elapsed time and a remaining time for said slide presentation.

14. The method as recited in claim 10 wherein said monitoring module displays an elapsed time and a remaining time allocated to a currently displayed slide.

15. The method as recited in claim 10 wherein a warning of time remaining and an expiration time for said slide presentation is displayed on said monitor.

16. The method as recited in claim 15 wherein said warning is displayed on said monitor using different colors if said slide presentation is on time or running late.

17. The method as recited in claim 10 wherein said user can suppress said time status for said slide presentation.

18. The method as recited in claim 10 wherein said user can suppress said time status for said currently displayed slide.

* * * * *